No. 650,295. Patented May 22, 1900.
O. P. BOULARD.
CUT-OFF DEVICE FOR HYDRANTS.
(Application filed Oct. 12, 1899.)
(No Model.)
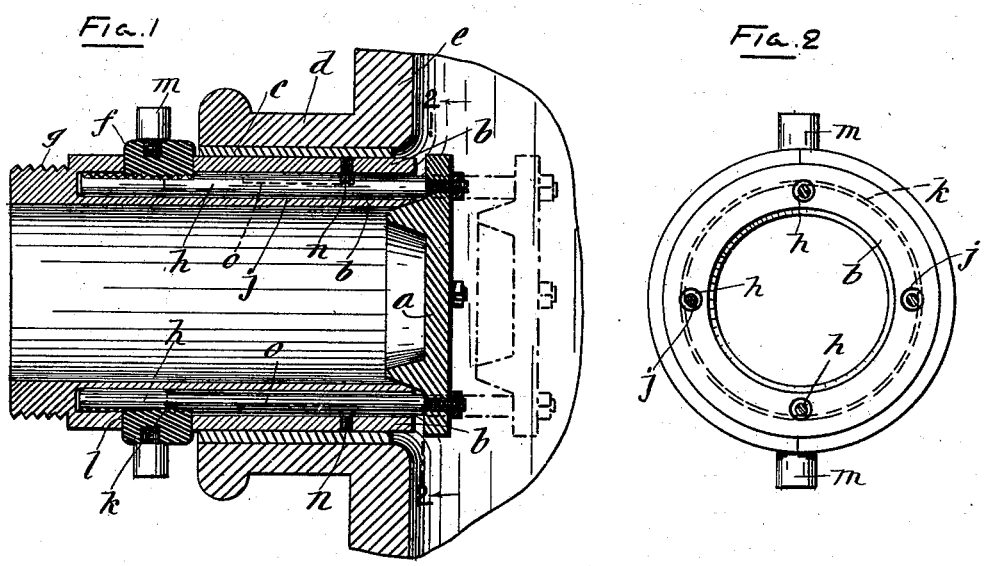
Witnesses
Inventor
Oscar P. Boulard
By his Attorney

United States Patent Office.

OSCAR PIERRE BOULARD, OF MONTREAL, CANADA, ASSIGNOR OF ONE-HALF TO ZEPHERIN BENOIT, OF SAME PLACE.

CUT-OFF DEVICE FOR HYDRANTS.

SPECIFICATION forming part of Letters Patent No. 650,295, dated May 22, 1900.

Original application filed March 18, 1899, Serial No. 709,678. Divided and this application filed October 12, 1899. Serial No. 733,445. (No model.)

*To all whom it may concern:*

Be it known that I, OSCAR PIERRE BOULARD, of the city of Montreal, Province of Quebec, Canada, have invented certain new and useful Improvements in Cut-Off Devices for Hydrants; and I do hereby declare that the following is a full, clear, and exact description of the same.

This invention, which is a divisional part of an application filed on March 18, 1899, under Serial No. 709,678, relates to the cut-off device carried by each branch of a two or three branch hydrant, whereby the hose may be connected with either branch while the water is turned on; and the present invention has for its object to provide a cut-off or controller which can be operated quite independently of the hose and after the water-pressure is on and as long a time after the connection of the hose with the hydrant as may be desired. Heretofore the operation of such devices has been dependent upon the hose itself, there being usually a part of the device carried by the hose which acts upon other parts of the device in the branch of the hydrant; but such an arrangement is objectionable in that it not infrequently happens that the water is running through the hose before it is either securely connected or completely unwound from the fire-reel. The present invention, on the contrary and as before mentioned, secures an independent operation of the cut-off through an exterior actuating part permanently carried by the cut-off device of each branch of the hydrant and having an operative connection with the interior valve-section of the device, so that the hose can be connected with the branch without in any way affecting the cut-off and the latter operated whenever desired quite independently of the hose. For full comprehension, however, of the invention, reference must be had to the annexed drawings, forming a part of this specification, in which like symbols indicate corresponding parts, and wherein—

Figure 1 is a longitudinal vertical section of my improved cut-off device and the hydrant branch to which it is applied, and Fig. 2 a transverse section of same on line 2 2, Fig. 1.

The valve-section is shown in the form of a disk $a$, faced to bear against the inner end of the sleeve $b$, and in this case the actuating part or ring $f$ is operatively connected with the valve $a$ through four slide-rods $h$, working in ways $j$, extending longitudinally of the sleeve $b$, and having their inner ends secured to the valve and their outer end portions screw-threaded on one side, as at $k$, to mesh with the screw-threaded inner periphery of the ring $f$, the rotation of which (within an annular groove $l$ in the sleeve) by a key fitted over the projections $m$ on the ring will serve to work such slide-rods back and forth and so operate the valve.

Any tendency of the slide-rods toward rotation may be prevented, if found necessary, by fitting the sleeve with pins $n$, adapted to project into grooves $o$, formed in the slide-rods, as shown in Fig. 1.

What I claim is as follows:

A cut-off device for hydrants located within the branches or outlet thereof and comprising a sleeve set in the branch or outlet and having an encircling perimetrical recess outside of said branch or outlet; a valvular disk to close the inner end of said sleeve; a series of rods connected at their inner ends to said disk and having their outer ends extending beyond and intersecting said perimetrical recess; a rotatable ring taking into said recess; the radial outer sides of said rods and the radial inner face of said ring being correspondingly screw-threaded, substantially as described and for the purpose set forth.

In testimony whereof I have affixed my signature in presence of two witnesses.

OSCAR PIERRE BOULARD.

In presence of—
 FRED. J. SEARS,
 ARTHUR H. EVANS.